Figure 1:
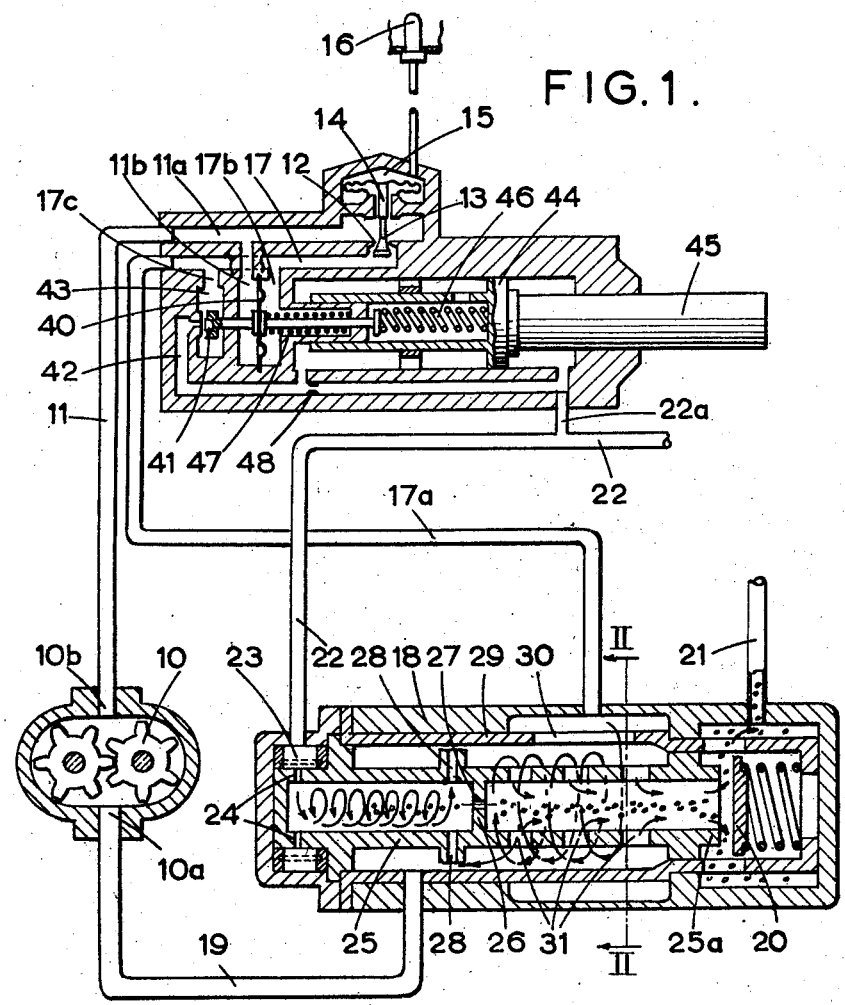

Feb. 25, 1958    K. A. BASFORD    2,824,423
HYDRAULIC SPEED RESPONSIVE CIRCUITS
Filed Oct. 3, 1955

INVENTOR

BY Leech and Radure

ATTORNEYS

United States Patent Office 2,824,423
Patented Feb. 25, 1958

2,824,423

HYDRAULIC SPEED RESPONSIVE CIRCUITS

Kenneth Arnold Basford, Alvaston, Derby, England, assignor to Rolls-Royce Limited, Derby, England Application October 3, 1955, Serial No. 538,007

Claims priority, application Great Britain October 13, 1954

8 Claims. (Cl. 60—52)

This invention relates to hydraulic speed responsive systems, hereinafter referred to as "the type specified," comprising a positive displacement fixed capacity hydraulic pump driven by a prime mover at a speed proportional to that of the prime mover, flow restricting means through which is passed the delivery flow from the pump, thereby to cause across the flow restricting means a pressure drop which is a function of the rotational speed of the prime mover, and pressure responsive means subjected to the pressure drop and arranged to effect a controlling action associated with the operation of the prime mover.

For example a hydraulic speed responsive system of the type specified may be used to control the fuel supply to the prime mover in a manner such as to maintain a preselected rotational speed or to avoid a predetermined maximum rotational speed being exceeded.

As a further example a hydraulic speed responsive system of the type specified may be used to actuate in a predetermined manner related to the rotational speed of the prime mover, control means effecting the air flow in the prime mover; such an arrangement is suitable for controlling gas-turbine engines, for example by adjustment of swirl or stator vanes in a compressor, adjustment of nozzle guide vanes in a turbine or variation of the effective area of a propelling nozzle receiving exhaust gases from a turbine, said adjustment or adjustments being effected in accordance with a preselected rotational speed of the gas turbine or in accordance with a range of rotational speed.

The present invention seeks to provide an improved hydraulic speed responsive system of the type specified.

According to the present invention a hydraulic speed responsive system of the type specified has a circulating hydraulic flow circuit there being provided an outflow connection from said circuit through which liquid leaves the circuit and an inflow connection to said circuit from an external liquid pressure supply source through which connection supplemental liquid enters the circuit, both said connections being located on the downstream side of the flow restricting means and wherein the flows through said connections are so regulated as to maintain the pressure on the inlet side of the pump at a value in excess of ambient atmospheric pressure. In speaking of downstream, of course, the circuit is deemed to flow from the delivery side of the pump to the intake side of the pump.

Preferably the outflow connection from the circuit is through relief valve means and the inflow connection may include a flow restrictor. It will be appreciated however that the relief valve means may be replaced by a flow restrictor.

The adoption of the invention has been found to reduce the tendency for free air or vapour to circulate in the hydraulic circuit, whilst additional flow of liquid through the outflow and inflow connections avoids the over heating of liquid in the circulating circuit.

In accordance with a further feature of the invention the liquid after passing through the flow restricting means is introduced into a swirl chamber, liquid being bled off from the centre of said chamber through the relief valve or restricted outflow from the system. The adoption of this feature provides that free air or vapour in the circulating system is carried out by the flow through the outflow.

Conveniently the liquid used in the hydraulic circuit is either fuel or oil of the prime mover; for example in the case of the gas-turbine engine the high-pressure fuel system may provide a source introducing liquid into the hydraulic circuit, whilst the flow though the relief valve may be returned to the inlet side of the main fuel pump or to a supply tank. Alternatively the hydraulic liquid may be lubricating oil, the capacity of the oil pump of the prime mover being appropriately increased to provide for the flow through the relief valve in the hydraulic circuit.

Where the hydraulic circuit is connected as described above to an engine high-pressure fuel system or lubricating system, it will be appreciated that the governor will continue to function satisfactorily despite any temporary discontinuity in the supply from the engine system; such discontinuity may for example arise where changeover from one fuel tank to another is effected or for example during inverted flight of the aircraft. In the particular applications of the hydraulic governor described below it is important that the functioning of the governor circuit, effecting a controlling action on the engine, should not be disturbed during such temporary discontinuities of supply in the engine system.

A preferred embodiment of the invention is described with reference to the accompanying drawing which illustrates a hydraulic speed responsive system suitable for effecting a controlling action on a gas-turbine engine in accordance with a range of speed. Examples of such controlling action are described in U. S. A. Patent 2,705,590 granted April 5, 1955, where swirl vanes of an air compressor are controlled in accordance with the range of rotational speed of the compressor, and in U. S. A. Patent 2,741,423, granted April 10, 1956, where bleed valves on a compressor are controlled in accordance with a range of speed of the compressor.

Figure 2:
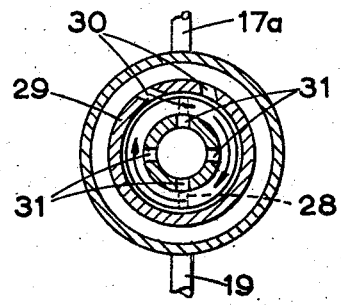

In the drawing,

Figure 1 is a diagrammatic cross section of the hydraulic speed responsive system, and Figure 2 is a section on the line II—II of Figure 1.

Referring to Figure 1 the hydraulic speed responsive system comprises a gear pump 10 which is arranged to be driven by a gas-turbine engine at a speed proportional to that of the engine. The inlet side of the pump is indicated at 10a and the delivery side at 10b. The pump delivers liquid under pressure through pipeline 11 and duct 11a to flow restricting means provided by an orifice 12; the effective area of the orifice is varied by means of a valve element 13 supported on a capsule 14 which capsule is in a chamber 15 connected to a temperature bulb 16. The temperature bulb may be located in the inlet to the compressor of the gas-turbine engine, whereby it senses compressor inlet temperature ($T_1$). In this manner the governor may be responsive to an engine rotational speed which is a function of $\sqrt{T_1}$ for example to effect a controlling action in accordance with a preselected value of $N\sqrt{T_1}$ where N is the actual rotational speed of the engine.

The liquid passing through the orifice 12 flows in duct 17 and pipeline 17a to a relief valve and de-aerator assembly generally indicated at 18, whence a pipeline 19 connects to the inlet side of the pump 10a. It will be seen that the pump 10, pipeline 11, duct 11a flow restricting means 12, duct 17, pipeline 17a, assembly 18 and pipeline 19 form a circulating hydraulic circuit.

Liquid can leave this circuit through an outflow connection in the assembly 18 comprising a spring loaded valve element 20, the flow through the relief valve passing to a drain pipe 21. Liquid is introduced into the hydraulic circuit from a high-pressure supply line 22 which enters the body of the assembly 18 to a filter chamber 23 and thence through tangentially disposed orifices 24 in a sleeve element 25 of the assembly 18. The sleeve element 18 is formed with a partition 26 having a centrally disposed aperture 27 and is additionally formed with outlet passages 28 leading to the annular space between the sleeve 25 and an outer sleeve 29.

The sleeve 29 as more clearly shown in Figure 2 is formed with tangentially disposed slots 30 and is supported within the main body portion of the assembly 18. It will be noted that the liquid after passing through the orifice 12 enters the annular space between the sleeve 29 and the body portion of the assembly 18 by pipeline 17a. The liquid passes from this annular space through the tangential slots 30 into the annular space between the inner and outer sleeves 25 and 29. On the right hand side of the partition wall 26 the inner sleeve 25 is formed with sets of radially-disposed passages 31 leading to the interior of the sleeve, which has an open ended bore facing the relief valve element 20, the extremity of the sleeve 25a therefor forms the seat for the relief valve element 20.

It will be noted that free air or vapour in the liquid introduced through orifices 24 will tend to form an axial core within the sleeve 25 and will tend due to the pressure drop across the radial passages 31 to pass through the orifice 27 in the partition 26.

The relative restrictions of the radial passages 28 and the orifice 27 may be such as to cause approximately 10% of the liquid entering the circuit through the supply line 22 to pass through the orifice 27. Likewise free air or vapour in the liquid flowing into the assembly 18 through pipeline 17a will tend to pass through the passages 31 to the interior of the sleeve 25. Thus free air or vapour in the circulating system will tend to be carried out by the flow of hydraulic fluid bled off from the relief valve 20.

It will be further appreciated that the flow through the relief valve 20 will be determined by the quantity of liquid flowing into the system through the pipeline 22, this flow being metered by the orifices 24. In the operation of the governor system it is preferable that a major part of the liquid in the circuit is replaced in circulation. Thus the rate of flow entering the hydraulic circuit through pipeline 22 may represent approximately 5–10% of the rate at which the pump 10 passes liquid at cruise power rating of the engine. This flow assists in maintaining the liquid in the circuit cool.

The hydraulic speed responsive system described above produces a pressure drop between duct 11a and duct 17 which is a function of the rotational speed of the gas-turbine engine and is applied to pressure responsive means in the form of a diaphragm 40 through duct passages 11b and 17b. This diaphragm serves to control a valve 41 regulating the relief flow of servo liquid through duct 42, said relief flow passing through duct 43 into duct 17. The servo liquid is derived from high-pressure pipeline 22 through tapping 22a, and is applied to the two sides of a piston 44 supported on a ram 45. The ram which may be used for adjusting inlet guide vanes or stator blades of an axial-flow compressor or bleed valves therefor moves to load a coiled spring 46 to an extent proportional to the adjustment of the stator blades or bleed valve. Spring 46 together with spring 47 loads the diaphragm 40 and valve 41 on to its seat. It will be noted that the piston 44 is effectively of differential area; further the hydraulic pressure loading the right-hand side of the piston (of lesser area) is the fluid pressure of the tapping from the pipeline 22 whilst the pressure loading the left-hand side of the piston (of greater area) is the pressure regulated by the extent of opening of the valve 41 in relation to the size of a fixed orifice 48.

Assuming the valve 41 to be closed the pressure on the left-hand side of the piston will tend to equal that on the right hand side of the piston due to flow through the orifice 48 and the ram 45 will move to the right. If the valve 41 is opened then the pressure on the left-hand side of the piston will drop and the ram will move to the left.

Since the loading on the diaphragm 40 is proportional to the pressure drop across the orifice 12 the valve 41 will open when a preselected value of the pressure drop is reached. This preselected value will depend on the position of the ram 45 due to the rate of the spring 46, and thus for each rotational speed of the gas-turbine engine over a certain range there will be a corresponding position of the ram 45. It will be appreciated that the flow of servo liquid through the valve 41 enters the hydraulic circuit through duct 17c communicating with duct 17 and pipeline 17a. Under the conditions when this valve is passing liquid the flow may be appreciable, for example up to 100% or more of the flow passed by the governor pump 10. Such additional flow into the hydraulic circuit will pass out from the relief valve 20. Liquid can thus enter the system in this way via pipe 17a and also via pipe 22 and in each case it passes through the deaerating device 18 before entering the pump. All liquid circulated by the pump also passes through device 18 before being returned to the pump inlet.

It will be appreciated that by ommission of the spring 46 the speed hydraulic responsive system described above could be utilised to maintain a preselected constant rotational speed of the gas-turbine engine, the ram 45 being connected to a fuel control.

Preferably, in the system described above, the pipeline 22 is connected to a high-pressure fuel delivery line in the engine fuel system, whereby engine fuel is used in the speed responsive system and in the ram servo system associated therewith.

I claim:

1. A hydraulic speed responsive system comprising a positive displacement fixed capacity hydraulic pump driven by a prime mover at a speed proportional to that of the prime mover, flow restricting means through which is passed the delivery flow from the pump, thereby to cause across the flow restricting means a pressure drop which is a function of the rotational speed of the prime mover, and pressure responsive means subjected to the pressure drop and arranged to effect a controlling action associated with the operation of the prime mover and in which the pump circulates liquid round a hydraulic flow circuit back to its inlet, there being provided an outflow connection from said circuit through which liquid leaves the circuit and an inflow connection to said circuit from an external liquid pressure supply source through which connection supplemental liquid enters the circuit, both said connections being located on the downstream side of the flow restricting means, and flow restricting means in said connections so regulated as to maintain the pressure on the inlet side of the pump at a value in excess of ambient atmospheric pressure.

2. A system as claimed in claim 1 in which the outflow is through relief valve means and the inflow means incorporates a restrictor.

3. A system as claimed in claim 1 in which the outflow is through a flow restrictor and a restrictor is placed in the inflow.

4. A system as claimed in claim 1 having a gas and vapor separator connected to the said hydraulic flow circuit and means in said separator to discharge any gas or vapor occurring in the system with the liquid vented through said outflow connection.

5. A system as claimed in claim 4 in which the liquid circulating in the system after it has passed through the flow restricting means is introduced into a swirl chamber in said separator, and means to bleed off liquid from the centre of said chamber through the outflow.

6. A system as claimed in claim 4 in which the liquid introduced into the system from the pressure supply source is introduced into a swirl chamber in said separator, and means to bleed off liquid from the centre of said chamber through the outflow from the system.

7. A system as claimed in claim 4 in which the gas and vapor separator incorporates an outer casing containing two coaxial, radially spaced tubes, the inner tube having a perforated partition dividing its interior into two axially displaced communicating spaces, means to feed liquid from said pressure supply source into one of said spaces in the inner tube through tangentially-disposed orifices thereby to be swirled, outlet means in the wall of the inner tube from said one space into the annulus between the two tubes, the gas and vapor removed from the liquid from said source passing through the perforated partition into the second of said spaces, means including tangentially-disposed slots feeding the liquid from the flow restricting means into the annulus between the two tubes surrounding the second of said spaces to cause the liquid to swirl around the inner tube, holes in the inner tube to pass gas and vapor thus removed from the liquid into the center of the tube, outflow means from the space between the two tubes to receive the degassed liquid connected to the inlet of the pump, and outflow means for the excess liquid and removed gas and vapor in the system from the second space in the inner tube.

8. A system as claimed in claim 1 in which there is provided a ram comprising a piston exposed on opposite sides to the pressure of liquid from a pressure source, a valve controlled leak to such fluid pressure arranged on one side of the piston, said valve being controlled by a pressure responsive device exposed to the drop in pressure across said flow restricting means in said hydraulic circulating system, and liquid flowing into the system from said pressure source through said valve when open and means also delivering said liquid into the system independently of the valve.

References Cited in the file of this patent

UNITED STATES PATENTS

| | | |
|---|---|---|
| 2,251,664 | Davis | Aug. 5, 1941 |
| 2,442,954 | Lee | June 8, 1948 |
| 2,594,689 | Sharp et al. | Apr. 29, 1952 |
| 2,603,065 | Sarto | July 15, 1952 |